United States Patent [19]
Kim et al.

[11] Patent Number: 5,931,082
[45] Date of Patent: Aug. 3, 1999

[54] DOUBLE BOILER FOR DOMESTIC USE

[75] Inventors: Yong Jin Kim; Joon Hwan Kim; Chan Young Chung; Byoung Kil Lee; Kyoung Sang Yu, all of Seoul; Young Ho Lim, Kyunggi-do, all of Rep. of Korea

[73] Assignee: Daewoong Electric Industrial Co., Ltd., Seoul, Rep. of Korea

[21] Appl. No.: 09/237,907

[22] Filed: Jan. 27, 1999

[30] Foreign Application Priority Data

| Apr. 9, 1969 | [KR] | Rep. of Korea | 98 12096 |
| Apr. 6, 1998 | [KR] | Rep. of Korea | 98 12095 |
| Aug. 14, 1998 | [KR] | Rep. of Korea | 98 32991 |
| Aug. 14, 1998 | [KR] | Rep. of Korea | 98 32992 |

[51] Int. Cl.$^6$ .............................. A47J 27/04; A47J 27/21; A61L 2/00; A61L 2/06
[52] U.S. Cl. .................................. 99/342; 99/285; 99/283; 99/293; 99/317; 99/355; 99/403; 99/417; 99/450; 422/26; 422/295; 422/298; 422/300
[58] Field of Search .............................. 99/330, 341, 342, 99/285–315, 317, 283, 352–355, 403, 407, 410–418, 450, 467, 468, 483, 485; 126/369, 20, 377, 378, 384, 389, 246, 262; 134/95.2, 102.2, 99.2, 105, 186, 94.1, 100.1; 210/514, 800, 167; 220/573.4, 573.2, 912; 219/688, 387, 492, 401; 422/26, 33, 28, 295–300, 308, 309; 426/510, 511, 521, 523, 506

[56] References Cited

U.S. PATENT DOCUMENTS

| 3,641,992 | 2/1972 | Peyser et al. ............................ 126/378 |
| 3,659,584 | 5/1972 | Doyle et al. .............................. 126/369 |
| 3,806,699 | 4/1974 | Hannivig ............................. 219/521 X |
| 3,946,654 | 3/1976 | Janssen ................................. 99/410 X |
| 4,106,486 | 8/1978 | Lee ............................................. 99/403 |
| 4,808,377 | 2/1989 | Childers et al. ........................... 422/26 |
| 4,915,606 | 4/1990 | Shimokawa .............................. 422/295 |
| 5,290,511 | 3/1994 | Newman ............................. 422/298 X |
| 5,366,693 | 11/1994 | Burgos et al. ............................ 422/26 |
| 5,474,738 | 12/1995 | Nichols et al. ..................... 422/300 X |
| 5,571,476 | 11/1996 | Newman .................................. 422/26 |
| 5,723,090 | 3/1998 | Beerstecher et al. .................. 134/94.1 |
| 5,813,318 | 9/1998 | Zanin et al. .......................... 99/293 X |

Primary Examiner—Timothy F. Simone
Attorney, Agent, or Firm—Staas & Halsey

[57] ABSTRACT

A double boiler for domestic use includes a heating vessel for receiving water and a filtering device containing food, the vessel having a lid on the top; a main case having a reception hollow and a heater at one side so that the heating vessel is mounted and heated; a steam condenser incorporated in the top end of the main case so that steam produced from the heating vessel is collected; steam cooling device for circulating cooling water along the inner and outer circumferential surfaces of the steam condenser so that the steam collected in the steam condenser becomes cooled; and a condensed water collecting device for receiving the heating vessel to the hollow of the main case and at the same time connecting the heating vessel and steam condenser so that the condensed water condensed in the steam condenser is gathered into the heating vessel.

8 Claims, 13 Drawing Sheets

FIG.1

PRIOR ART

DOUBLE BOILER FOR DOMESTIC USE

FIELD OF THE INVENTION

The present invention relates to a double boiler for domestic use and more particularly, to a double boiler for domestic use whose heating vessel is automatically connected to the steam condenser when mounted on the main body, and with which the steam gathered in the steam condenser is quickly withdrawn by a cooling device.

BACKGROUND OF THE INVENTION

As generally known, a double boiler for domestic use is an appliance in which several kinds of medical stuff or other food are boiled down together with water by means of power for a predetermined time.

Figure 1:
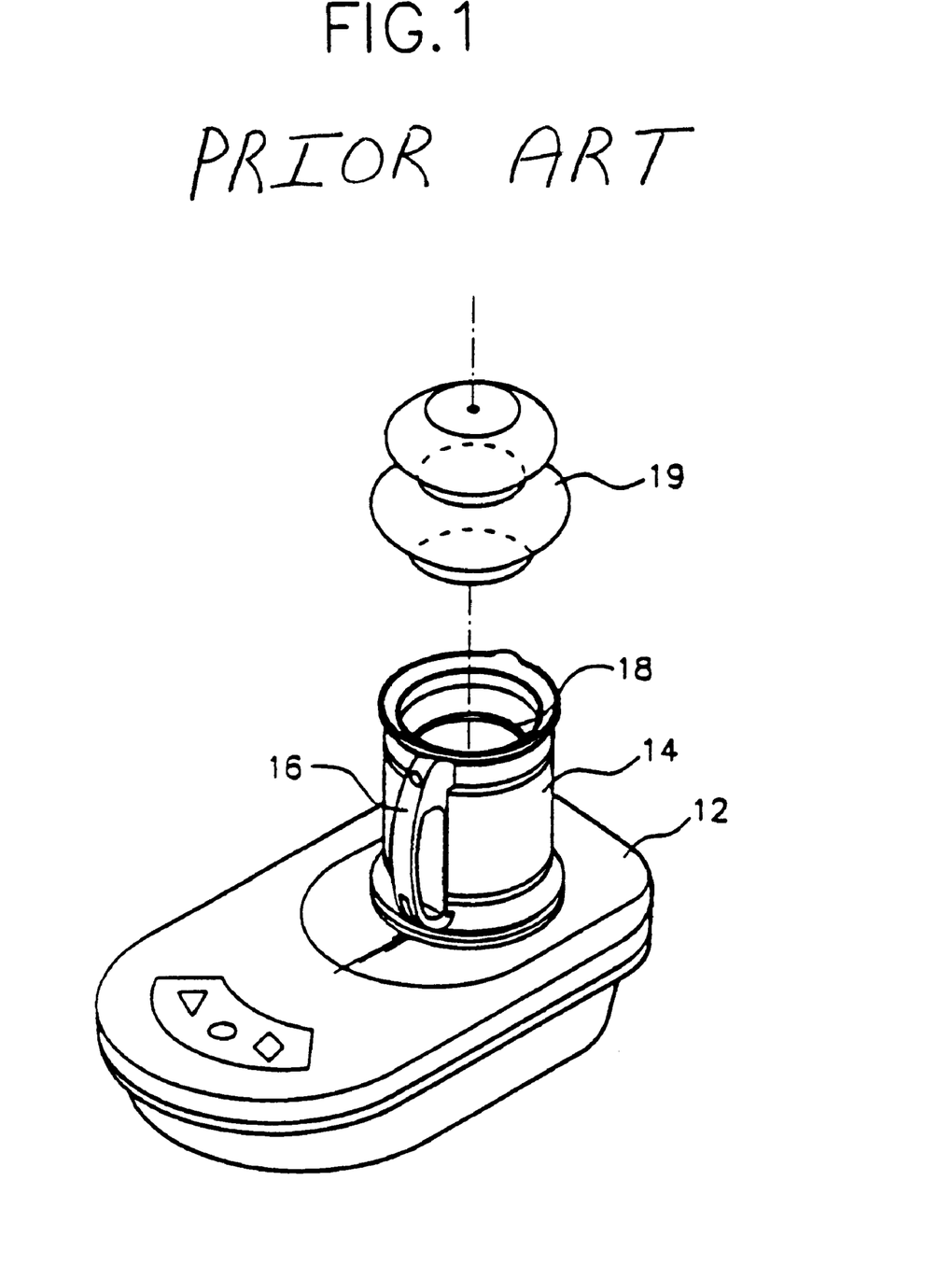
FIG. 1 is an exploded perspective of a conventional double boiler.

FIG. 1 is an exploded perspective of a prior art double boiler. As depicted in the drawing, double boiler for domestic use 10 comprises a main body 12 incorporated internally with several electrical components (not shown) such as heater, a heating vessel 14 made of glass and detachably mounted on the top of main body 12, a handle 16 installed on the outer surface of heating vessel 14, a filtering device 18 mounted on the inner surface of heating vessel 14 for containing various kinds of medical stuff, and a steam condenser 19 provided above heating vessel 14 for condensing the steam generated therefrom and thus collecting it into heating vessel 14.

The conventional double boiler constructed as above is, however, very inconvenient in that the steam condenser is manually joined with the heating vessel and disjoined therefrom after the decoction of medical stuff (in particular, Oriental medicines).

In addition, the steam containing components of medical stuff gathered in the steam condenser cannot be quickly cooled and withdrawn into the heating vessel during the process of decoction. The steam is unfortunately externally discharged so that the medical stuff components are lost. The steam leaked could make people feel uncomfortable when it spreads indoors.

Figure 2:
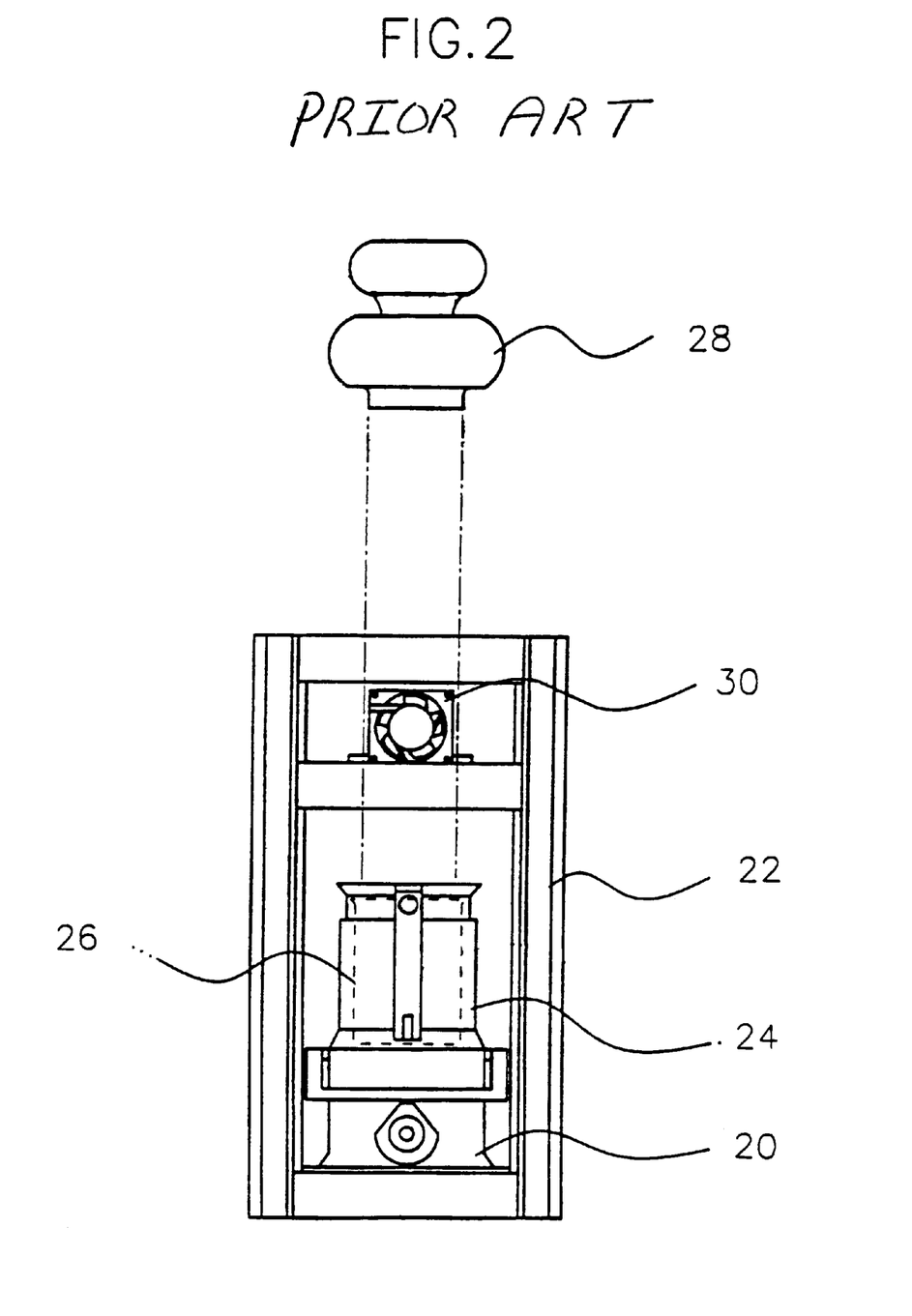
FIG. 2 is a side view of another conventional double boiler.

For those reasons, there has been suggested a deducting device in which a blower is installed above the steam condenser. This conventional structure is shown in FIG. 2. As in FIG. 2, the double boiler consists of a main body 20 having several electrical components (not shown) thereinside, a frame 22 to which main body 20 is supported, a heating vessel 24 made of glass and detachably mounted on the top of main body 20, an inner container 26 mounted on the inner surface of heating vessel 24 for receiving various kinds of medical stuff, a steam condenser 28 provided above heating vessel 24 so that the steam produced from heating vessel 24 is liquefied and thus collected thereinto, and a cooling fan 30 installed to frame 22 for cooling steam condenser 28.

This double boiler is effective in rapidly cooling steam, compared with that shown in FIG. 1. However, it is still inconvenient that the heating vessel and steam condenser should be manually joined or disjoined. In addition, the steam condenser is externally exposed so that the user may be unfortunately burned because of carelessness.

SUMMARY OF THE INVENTION

Therefore, in order to overcome such drawbacks of the prior art, an objective of the present invention is to provide a double boiler whose heating vessel is mounted on the main case and automatically coupled to the steam condenser for easy joining, which can rapidly collect most of the steam containing components of medical stuff during the process of decoction without loss, and which diminishes the smell of medical stuff as much as possible.

To accomplish the objective of the present invention, there is provided a double boiler for domestic use comprising: a heating vessel for receiving water and a filtering device containing food, the vessel having a lid on the top; a main case having a reception hollow and a heater at one side so that the heating vessel is mounted and heated; a steam condenser incorporated in the top end of the main case so that steam produced from the heating vessel is collected; steam cooling means for circulating cooling water along the inner and outer circumferential surfaces of the steam condenser so that the steam collected in the steam condenser becomes cooled; and condensed water collecting means for receiving the heating vessel to the hollow of the main case and at the same time connecting the heating vessel and steam condenser so that the condensed water condensed in the steam condenser is gathered into the heating vessel.

The steam cooling means comprises: a spiral circulating pipe integrally formed on the outer circumference of the steam condenser and where cooling water is circulated; entrance/exit-side connecting tubes detachably connected to the upper/lower sides of the circulating pipe; a cooling water reservoir installed at the inner top end of the main case for storing cooling water; a cooling water circulating pump for forcibly circulating the cooling water of the reservoir into the circulating pipe through the entrance/exit-side connecting tubes; and heat-proof pins installed at the exit-side connecting tube for cooling heated cooling water which penetrates the exit-side connecting tube.

The condensed water collecting means comprises: a guiding pipe fixing member coupled to the lower center of the steam condenser and partially protuberant to the exterior of the main case; a hollow guiding pipe supporting member screw-coupled to part of the protuberant guiding pipe fixing member and having a hollow downward; a steam guiding pipe having steam holes and movably coupled to the hollow of the guiding pipe supporting member; a stopper extensively upwardly formed at the inner center of the steam guiding pipe for selectively opening or closing the guiding pipe fixing member along the up and down movement of the steam guiding pipe; and a resilient member inserted into the stopper for providing a resilient force to the steam guiding pipe.

BRIEF DESCRIPTION OF THE ATTACHED DRAWINGS

These and other features of the invention will be understood more clearly from the following description, read in conjunction with the drawings, in which.

DETAILED DESCRIPTION OF THE INVENTION

Hereinafter, preferred embodiments of the present invention will be described in detail with reference to the attached drawings.

Figure 3:
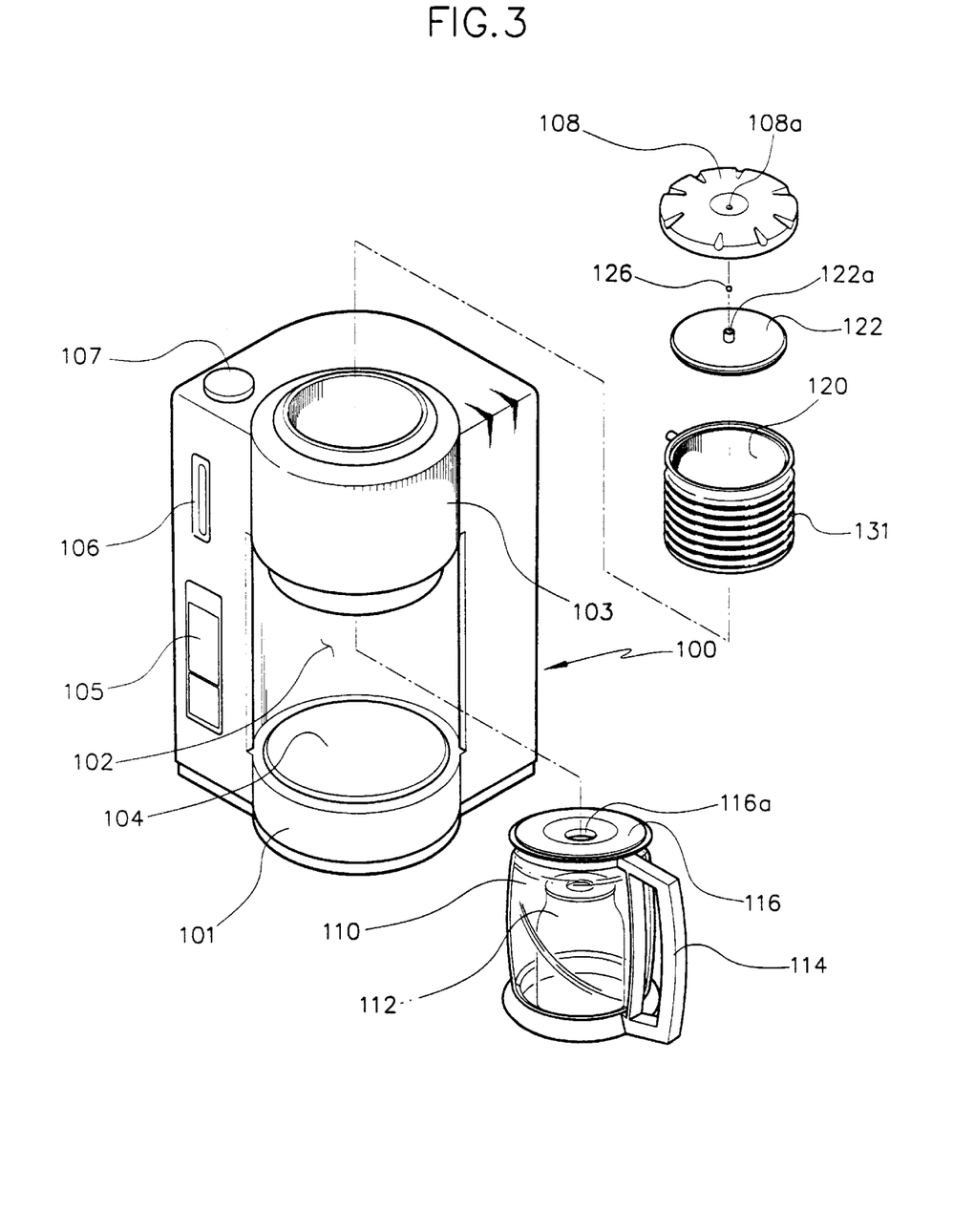
FIG. 3 is an exploded perspective of one embodiment of a double boiler of the present invention.
Figure 4:
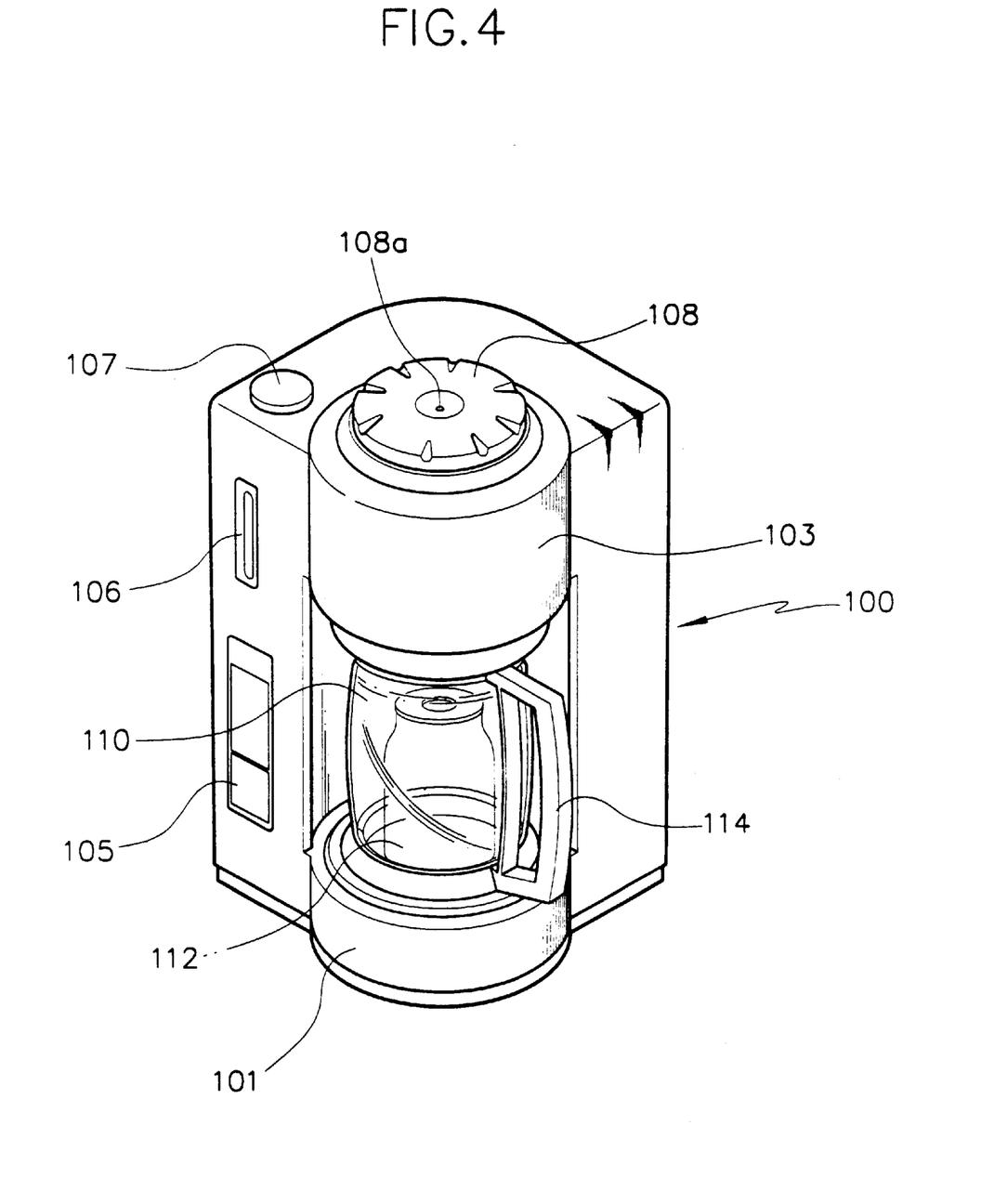
FIG. 4 is an assembled perspective of the embodiment of the present invention shown in FIG. 3.
Figure 5:
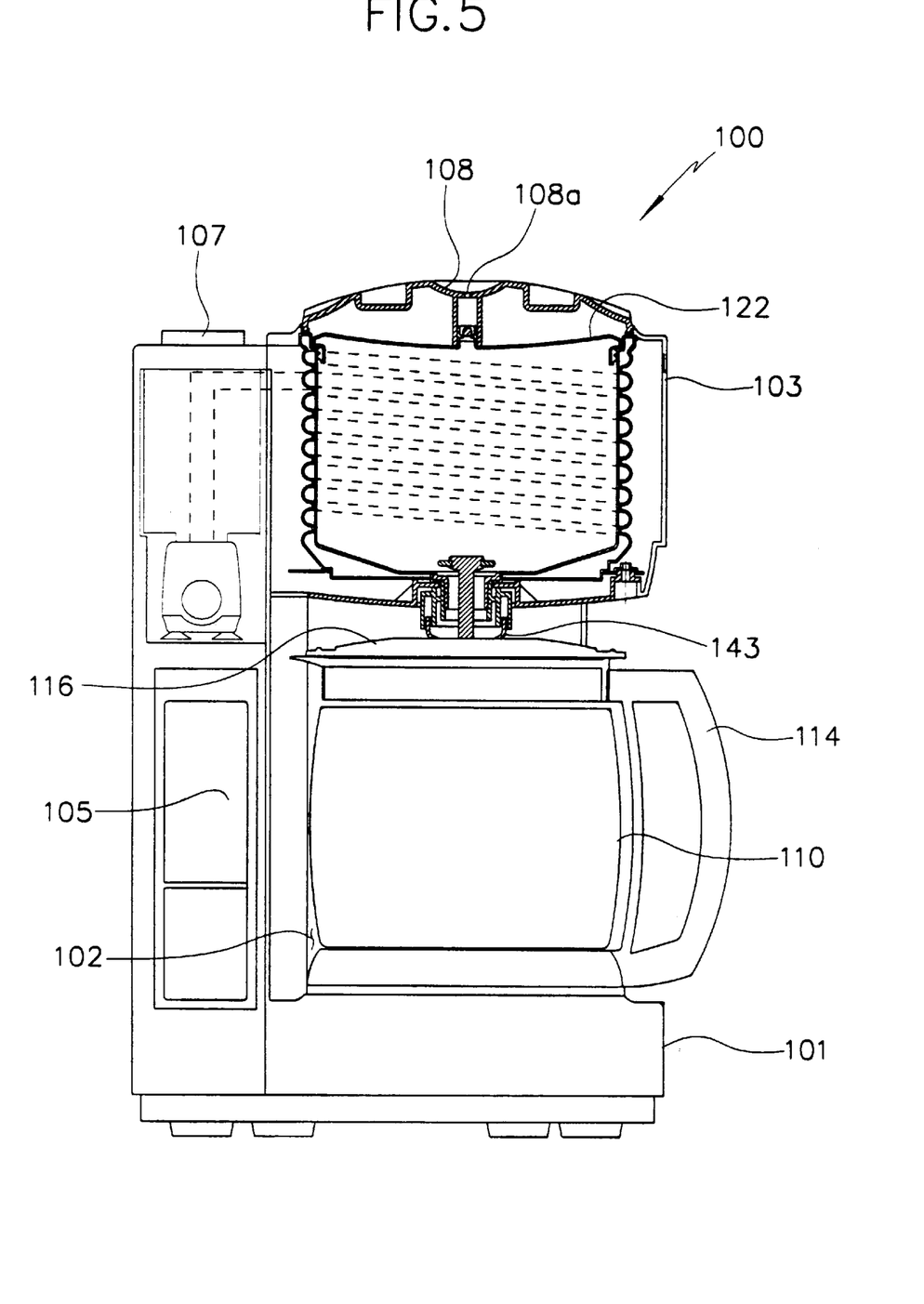
FIG. 5 is a partial vertical section of the double boiler of the present invention.

Referring to FIGS. 3, 4 and 5, a double boiler for domestic use of the present invention comprises a main case 100 having a heater 104 and operation panel 105, a heating vessel 110 made of glass for receiving water and filtering device 112 containing medical stuff, the vessel being heated by heater 104 of main case 100 for a predetermined time, the double boiler further comprising a steam condenser 120 for collecting steam produced from heating vessel 110 during the process of decoction, a steam cooling portion for cooling the steam gathered in steam condenser 120 by means of cooling water, and a steam collector for mounting heating vessel 110 onto main case 100 and communicating the heating vessel with steam condenser 120 so that the condensed water contained in steam condenser 120 is gathered into heating vessel 110.

More specifically, main case 100 is divided into bottom portion 101, middle portion 102, and top portion 103. The bottom portion includes built-in heater 104, and the middle portion has a hollow where heating vessel 110 is accepted. The top portion has steam condenser 120. On the outer side surface of main case 100 are provided operation panel 105 for controlling heater 104, and a residual indicator 106 for identifying the remainder of the cool water with the naked eyes. The top surface of main case 100 includes a residual indicator lid 107 communicating with residual indicator 106, and a lid 108 for closing steam condenser 120.

The heating vessel 110 accepts filtering device 112 containing medical stuff, and also water. A handle 114 is provided on the side surface of heating vessel 110, and a lid 116 is detachably coupled to the top of heating vessel 110. The lid 116 has a steam hole 116a in a predetermined diameter at its center. Here, it is preferable that the heating vessel is formed of heat-resistant glass, but handle 114 of plastic of a low heat conduction for the purpose of prevention of burning.

Figure 6:
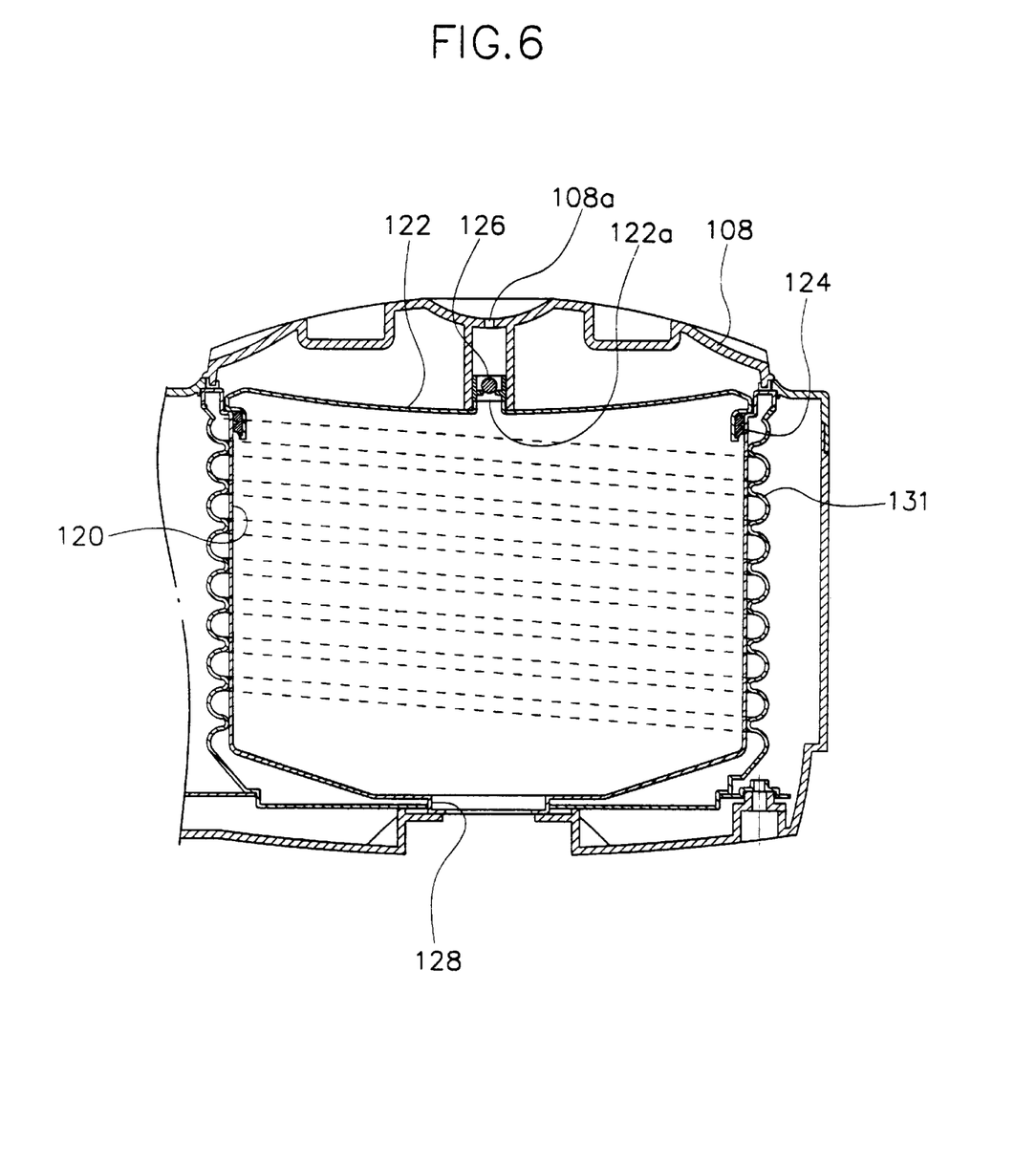
FIG. 6 is a vertical section of the steam condenser of the embodiment shown in FIG. 3.

The steam condenser 120 is located above heating vessel 110, and is at the same time incorporated in the top portion of main case 100 so that the steam generated from heating vessel 110 when water is boiled is collected into the condenser. As shown in FIG. 6, a lid 122 is coupled to the top of steam condenser 120. A packing 124 of heatproof ceramic is put around the outer circumference of lid 122. This packing acts to close the steam condenser 120. At the center of lid 122, there is a steam hole 122a for maintaining the internal pressure of steam condenser 120 constantly. Directly above the steam hole 122a, a ball 126 is positioned, when the internal pressure of steam condenser 120 is not high, to interrupt steam hole 122a due to its own weight, or, otherwise, to be raised upward because of the steam pressure higher than the weight of ball so that steam hole 122a is opened. Another steam hole 108a is formed at the center of lid 108, communicating with steam hole 122a. Here, steam condenser 120 is preferably made of aluminum so that it is able to transmit heat quickly.

Figure 7:
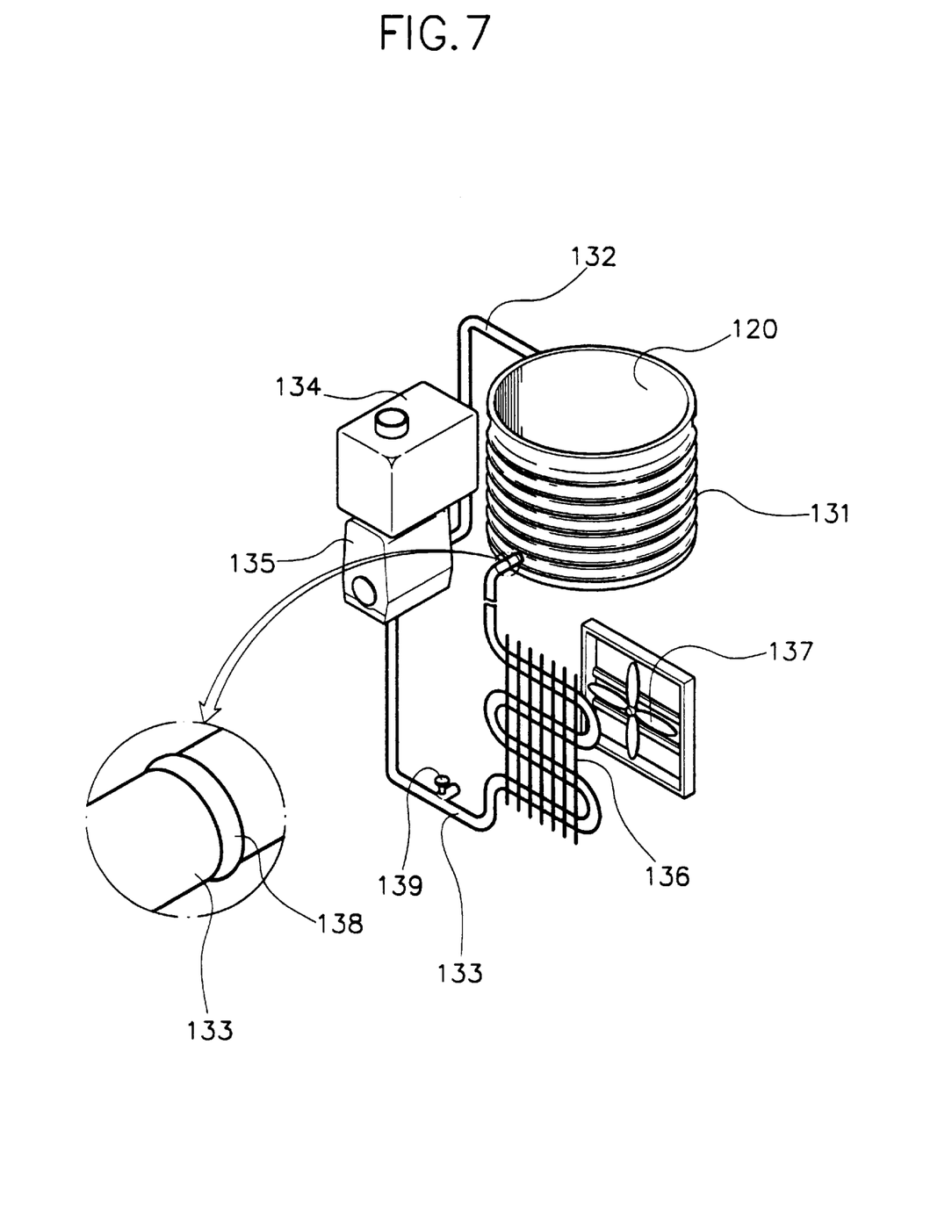
FIG. 7 is a construction view of the embodiment shown in FIG. 3.

Turning to FIG. 7, a steam condensing portion will be explained, which rapidly cools steam collected in steam condenser 120 by forcibly circulating cooling water. As shown in the drawing, the steam condensing portion includes a circulating pipe 131 formed on the outer circumference of steam condenser 120, entrance/exit-side connecting tubes 132 and 133 which connect to the entrance and exit formed on the upper and lower ends of circulating pipe 131, a cooling water reservoir 134 for storing cooling water supplied externally, a cooling water circulating pump 135 for forcibly circulating cooling water, heat-proof pins 136 for cooling water circulated, and a blowing fan 137 for cooling the heat-proof pins.

The circulating pipe 131 is integrally formed with the steam condenser on the outer circumference of steam condenser 120. More specifically, circulating pipe 131 is crimpled around the outer circumference of cylindrical steam condenser 120. The inner crimpled portion comes into contact with the outer circumference of steam condenser 120 and is at the same time compressively put so that a hollow where cooling water flows is formed thereinside. This hollow is formed spirally along the outer circumference of steam condenser 120 so that cooling water is circulated from top to bottom. Here, circulating pipe 131 is preferably made of a material, for instance, aluminum, which is light, strong and has a high thermal conduction.

The entrance/exit-side connecting tubes 132 and 133 may be detachably connected to the top end and bottom end of circulating pipe 131. Therefore, steam condenser 120 is selectively detached or coupled to entrance/exit-side connecting tubes 132 and 133. The ends of entrance/exit-side connecting tubes 132 and 133 are tightly fitted to the top and bottom ends of circulating pipe 131. The coupling portion is preferably interposed with silicon 138 so that cooling water is not leaked during its circulation. In the middle of exit-side connecting tube 133, a drain valve 139 is installed, which is exposed on the rear of main case 100 so that a user can discharge cooling water from connecting tubes 132 and 133 if necessary.

The cooling water reservoir 134 which stores cooling water is installed at the inner top of main case 100. Cooling water reservoir 134 communicates with the exterior of main case 100 so that cooling water is supplied externally at an appropriate time.

The cooling water circulating pump 135 is located at the inner top end of main case 100 so that cooling water stored in cooling water reservoir 134 is forcibly supplied into circulating pipe 131 through entrance/exit-side connecting tubes 132 and 133.

The heat-proof pins 136, installed in the middle of exit-side connecting tube 133, take heat from the heated cooling water flowing through entrance/exit-side connecting tubes 132 and 133. Here, it is preferable that entrance/exit-side connecting tubes 132 and 133 equipped with heat-proof pins 136 are bent several times in order to increase the heat-resistant area for more heat-proof effect.

The blowing fan 137 cools heat-proof pins 136 by forcibly blowing externally sucked cool air thereto or by externally blowing air sucked from the neighborhood of heat-proof pins 136. Here, heat-proof pins 136 are placed at the back of main case 100, where a plurality of ventilation holes (not shown) are formed.

Figure 8:
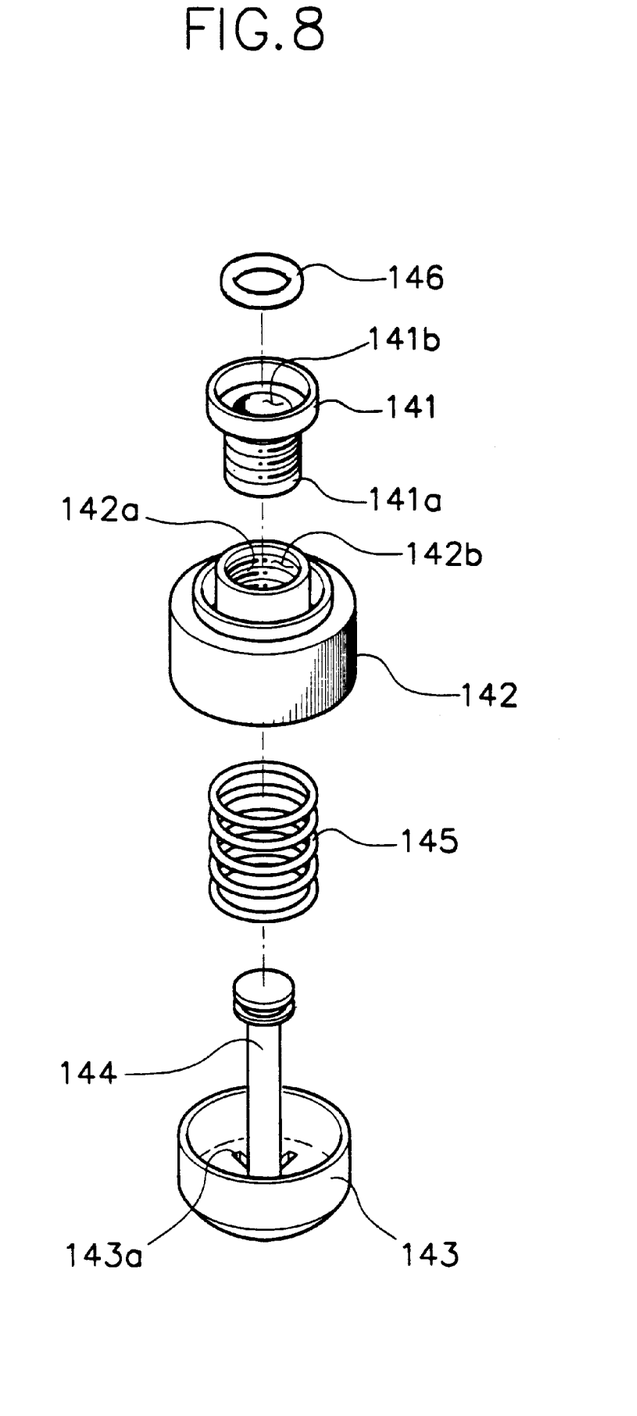
FIG. 8 is an exploded perspective of the steam collector of the embodiment of FIG. 3.

Referring to FIG. 8, there will be described a condensed water collector which connects heating vessel 110 and steam condenser 120 to gather condensed water condensed in steam condenser 120 to heating vessel 110. As shown in FIG. 8, the condensed water collector has a guiding pipe fixing member 141, guiding pipe supporting member 142, steam guiding pipe 143, stopper 144, and spring 145.

The guiding pipe fixing member 141 is arrested by a stop 124 formed at the lower center of steam condenser 120. Guiding pipe supporting member 142 is constructed to be coupled with screws 141a and 142a to part of protuberant guiding pipe fixing member 141, and to have a predetermined hollow downwardly.

The steam guiding pipe 143 is movably coupled to the hollow of guiding pipe supporting member 142, having a plurality of steam holes 143a on the lower side surface. Stopper 144 is extensively formed upward at the inner bottom center of steam guiding pipe 143 in order to selectively open/close the interior of guiding pipe fixing member 141 according to the up/down movement of steam guiding pipe 143. More specifically, when heating vessel 110 is mounted on the heater of main case 100, the lid 116 of heating vessel 110 comes into contact with steam guiding pipe 143, and at the same time the steam guiding pipe is raised by the lid 116. Here, stopper 144 integrally formed with steam guiding pipe 143 moves upward so that guiding pipe fixing member 141 is opened.

The spring 145, interposed in stopper 144, provides a resilient force to steam guiding pipe 143 so that it is shifted elastically during its up/down movement.

Figure 9:
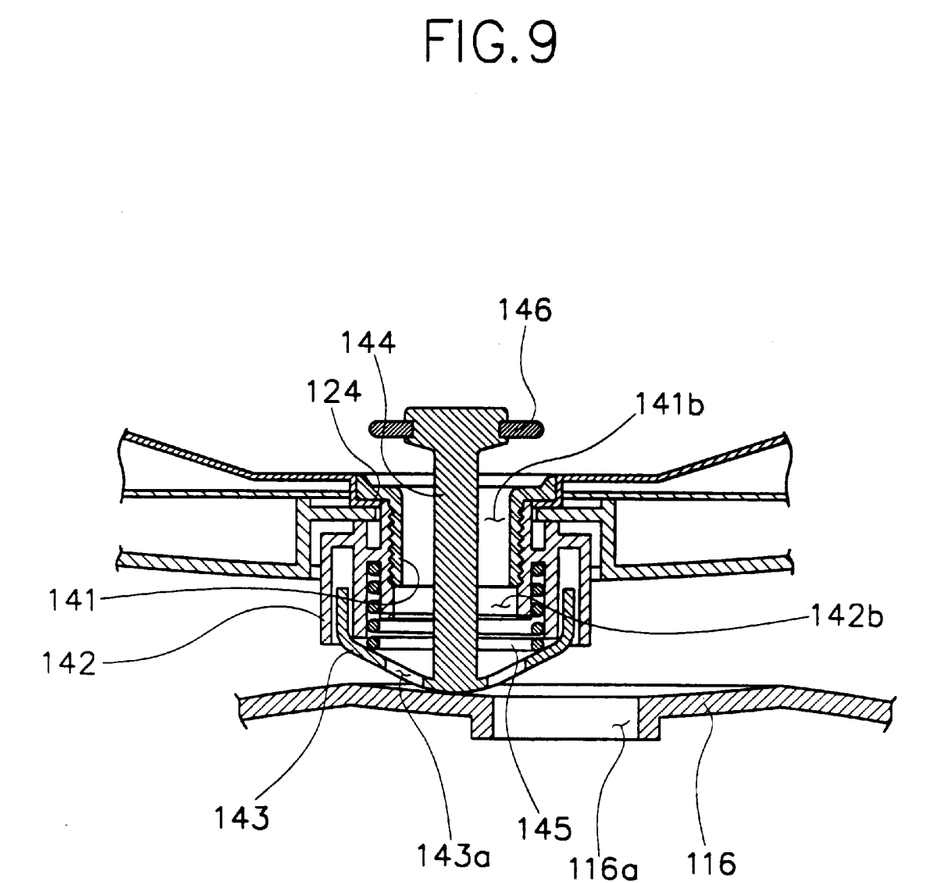
FIG. 9 is a side section of the condenser and heating vessel of the present invention prior to their joining.
Figure 10:
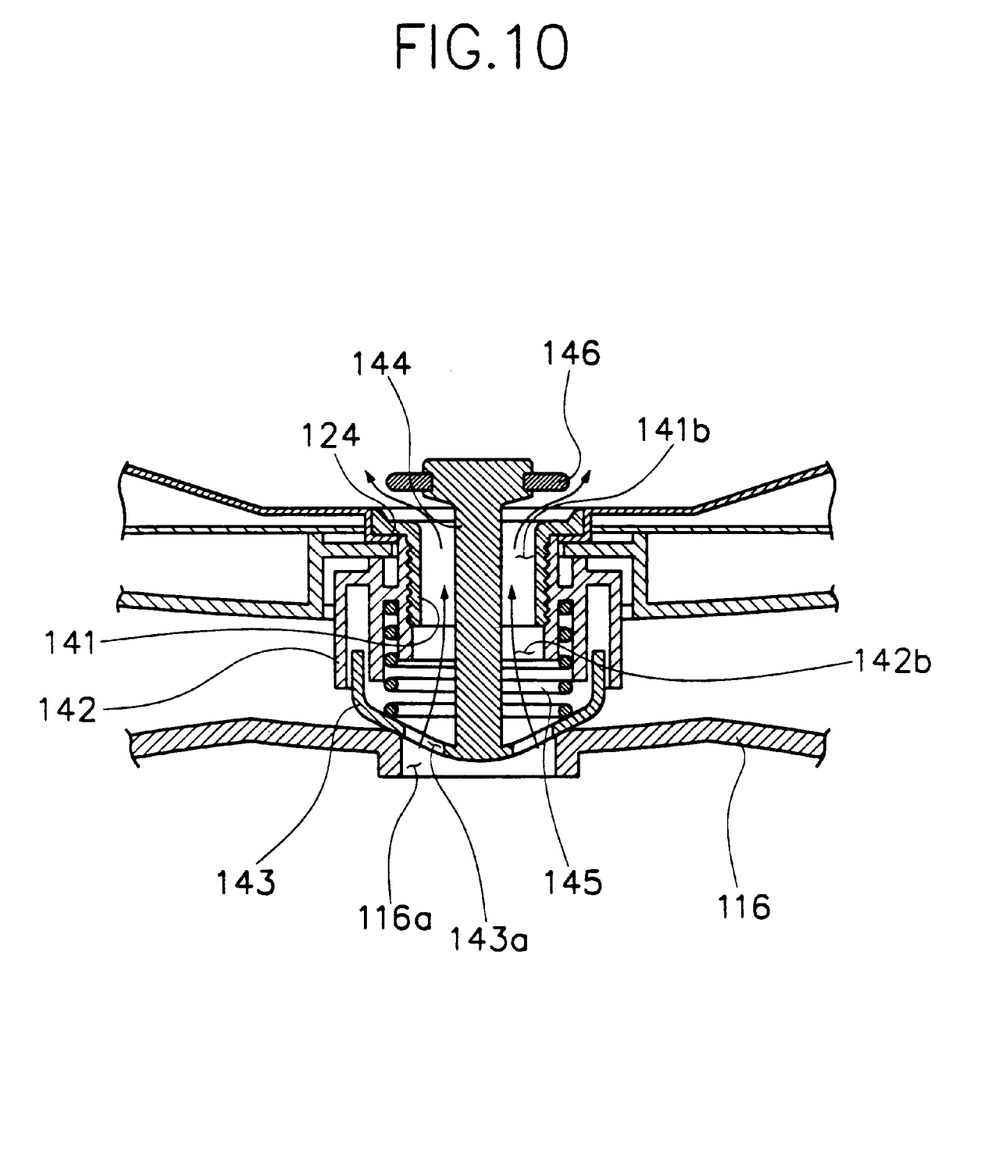
FIG. 10 is a side section of the condenser and heating vessel of the present invention when they are joined.

Now referring to FIGS. 9 and 10, there will be explained the procedure of joining the steam condenser. First of all, steam condenser 120 is mounted on the inner top end of main case 100. Then, guiding pipe fixing member 141 is inserted downward in steam condenser 120, and is caught by stop 124 formed on the lower portion of steam condenser 120. The screw 142a of guiding pipe supporting member 142 is coupled to screw 141a formed at the end of guiding pipe fixing member 141 by moving guiding pipe supporting member 142 upward. After coupling the guiding pipe supporting member to guiding pipe fixing member, spring 145 is inserted into stopper 144. The stopper 144 and steam guiding pipe 143 is shifted upward so that stopper 144 is inserted into guiding pipe fixing member 141 and at the same time part of steam guiding pipe 143 is put into the hollow of guiding pipe supporting member 142. In this state, rubber packing 144a is inserted from steam condenser 120 so as to be coupled to the end of stopper 144. Through this procedure, the assembly of steam condenser 120 and members 141, 142, 143, 144, 144a connected thereto is finished.

Meanwhile, in order to separate steam condenser 120 from main case 100 for the purpose of its washing after the complete decoction of medical stuff, the above-explained procedure is performed in the reverse order. For a brief description thereof, when rubber packing 144a is detached from the end of stopper 144, stopper 144 and steam guiding pipe 143 are separated downward. This process enables steam condenser 120 to be detached.

From now on, the usage of the double boiler of the present invention will be described. Referring to FIG. 5, water and filtering device 112 containing medical stuff are accepted in heating vessel 110, and then the lid 116 is closed. After that, heating vessel 110 is slidingly mounted on heater 104 of main case 100. Here, as in FIG. 9, downwardly protuberant steam guiding pipe 143 is slightly pressed upwardly by receiving the upward force exerted by lid 116 while overcoming the resilient force of spring 145.

As steam guiding pipe 143 is pressed upward, stopper 144 integrally formed with steam guiding pipe 143 is also moved upward. Here, rubber packing 144a provided at the end of stopper 144 opens guiding pipe fixing member 141 so that the steam holes are opened as in FIG. 10. In other words, the steam discharged from steam holes 116a formed on lid 116 of heating vessel 110 is collected into steam condenser 120 through the upward movement sequentially along the steam holes 143a of steam guiding pipe 143, steam holes 142b of guiding pipe supporting member 142, and steam holes 141b of guiding pipe fixing member 141.

When heating vessel 110 is completely mounted, medical stuff is boiled down for a predetermined time while appropriately controlling the boiling state by means of operation panel 105. During the decoction of medical stuff, water is boiled to produce steam, which is collected into steam condenser 120 sequentially along steam holes 116a, 143a, 142b, 141b. This collected steam becomes cool rapidly to be converted to condensed water by the steam cooling device. The condensed water falls downward due to its own weight so that it is gathered into heating vessel 110. Through repetitive procedure of the circulation, the steam containing medical stuff can be collected into heating vessel 110 without loss.

From now on, the procedure of cooling steam condenser 120 will be explained. Referring to FIGS. 6 and 7, cooling water circulating pump 135 is manipulated to carry cooling water of reservoir 134 to entrance-side connecting tube 132. The cooling water of entrance-side connecting tube 132 enters the upper portion of circulating pipe 131 to deprive steam condenser 120 of heat while turning therearound. This makes the steam condenser cooled. The cooling water heated by the heat from steam condenser 120 is discharged to the lower portion of circulating pipe 131, and enters exit-side connecting tube 133. The cooling water coming into exit-side connecting tube 133 becomes cool more or less by emitting heat through heat-proof pins 136. The cooling water becomes cooler by means of blowing fan 137. The cooling water cooled by heat-proof pins 136 and blowing fan 137 enters again cooling water reservoir 134. This process is performed repeatedly.

While cooling water is repeatedly circulated, steam condenser 120 becomes rapidly cooled, and thus the steam collected in steam condenser 120 is quickly converted into condensed water. Here, it is preferable that the cooling efficiency is raised by supplementing cooling water into reservoir 134.

In order to detach heating vessel 110 from main case 100 after the complete decoction of medical stuff, the above-explained procedure is performed reversely. Briefly, when heating vessel 110 is pulled slidingly and detached, steam guiding pipe 143 and stopper 144 pressed by the lid 116 of heating vessel 110 return to the original position by means of the resilient force of spring 145. Here, rubber packing 144a of stopper 144 interrupts the interior of guiding pipe fixing member 141. As rubber packing 144a of stopper 144 blocks the guiding pipe fixing member 141, condensed water remaining in steam condenser 120 does not fall any more.

Figure 11:
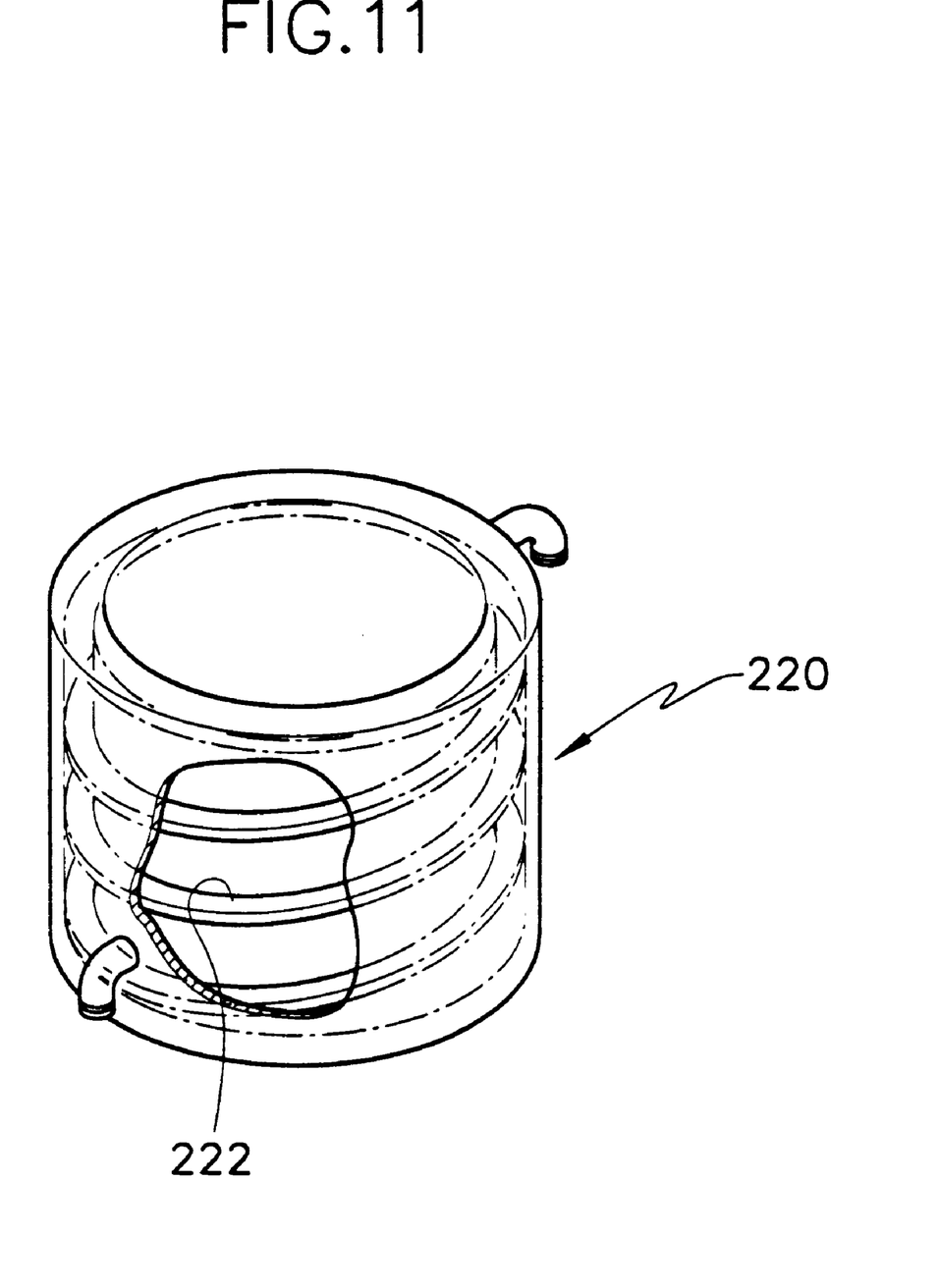
FIG. 11 is a partially cutaway perspective of another embodiment of the steam condenser of the present invention, in which a guiding piece is provided on its outer circumference.

FIG. 11 is a partially cutaway perspective of another embodiment of the steam condenser where a guiding piece is formed on the outer circumference. As in FIG. 11, the side wall of steam condenser 220 is formed with a hollow where cooling water flows, having a spiral guiding piece 222. Therefore, a hollow for allowing cooling water to flow is formed between guiding piece 222 and the side wall. Through this space, cooling water is circulated to make steam condenser 220 cooled.

Figure 12:
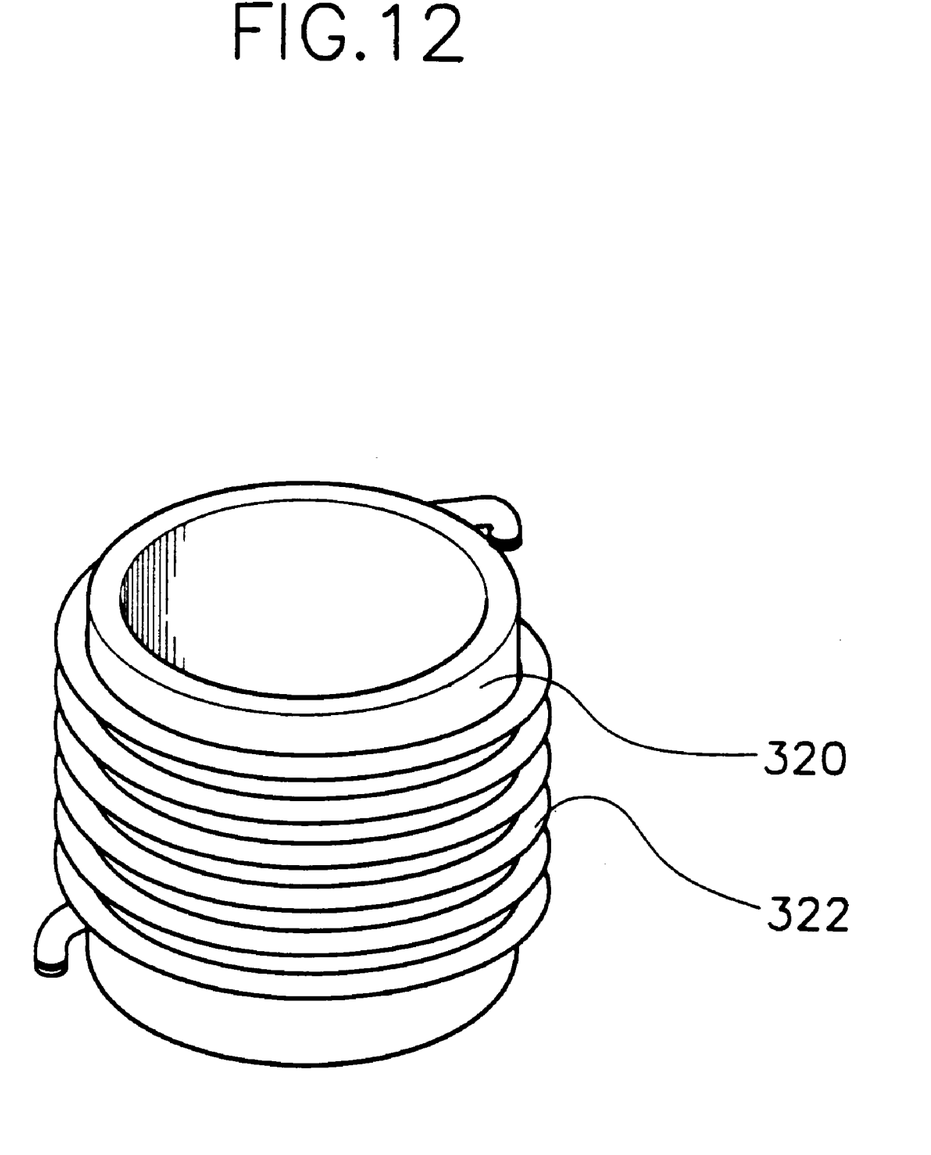
FIG. 12 is a perspective of still another embodiment of the steam condenser of the present invention, in which a cooling pipe is provided on its outer side wall.

FIG. 12 is still another embodiment of the steam condenser where a cooling pipe is formed on the outer side wall. As in FIG. 12, a hollow cooling pipe 322 where cooling water flows is spirally formed on the outer side wall of steam condenser 320.

Figure 13:
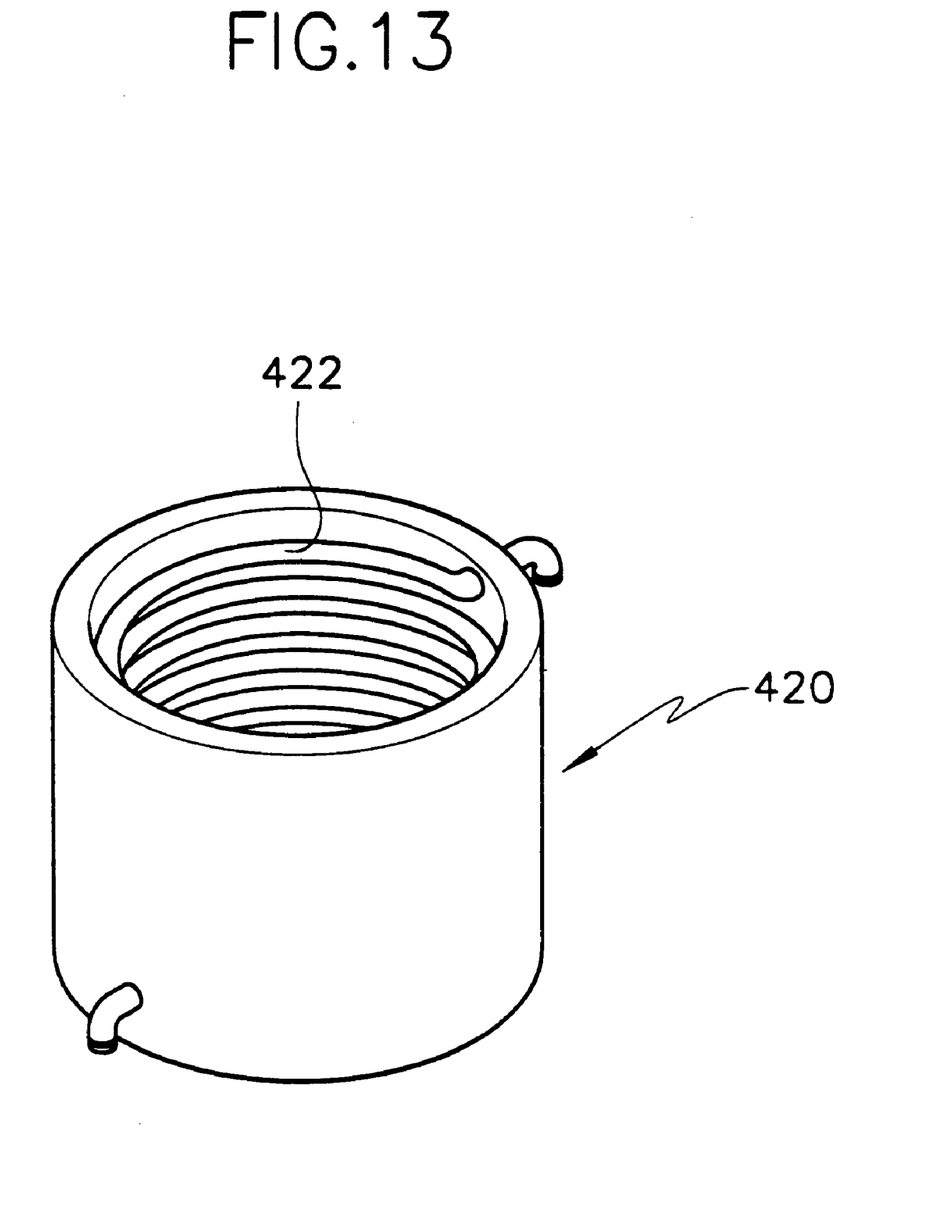
FIG. 13 is a perspective of yet another embodiment of the steam condenser of the present invention, in which a cooling pipe is formed on the inner side wall.

FIG. 13 is yet another embodiment of the steam condenser of the present invention where a cooling pipe is formed on the inner side wall. As in FIG. 13, a hollow cooling pipe 422 is formed spirally on the inner side wall of steam condenser 420, through which cooling water flows.

As described above, the steam condenser and heating vessel are automatically connected or blocked by slidingly mounting or detaching the heating vessel from the main body. Therefore, the double boiler of the present invention is very convenient, deprived of manual assembly or disassembly of the steam condenser from the heating vessel.

In addition, the steam collected in the steam condenser is rapidly condensed and gathered through the cooling device using cooling water so that the loss of steam containing medical stuff is reduced as much as possible, preserving medical components and removing their decoction smell.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foreand all changes n; and all changes which come within the meaning and range of equivalency of the claims are therefore intended to be embraced therein.

What is claimed is:

1. A double boiler for domestic use comprising:
   a heating vessel for receiving water and a filtering device containing food, the vessel having a lid on the top;
   a main case having a reception hollow and a heater at one side so that the heating vessel is mounted and heated;
   a steam condenser incorporated in the top end of the main case so that steam produced from the heating vessel is collected;
   steam cooling means for circulating cooling water along the inner and outer circumferential surfaces of the steam condenser so that the steam collected in the steam condenser becomes cooled; and
   condensed water collecting means for receiving the heating vessel to the hollow of the main case and at the same time connecting the heating vessel and steam condenser so that the condensed water condensed in the steam condenser is gathered into the heating vessel.

2. The double boiler as claimed in claim 1, wherein the steam cooling means comprises:
   a spiral circulating pipe integrally formed on the outer circumference of the steam condenser and where cooling water is circulated;
   entrance/exit-side connecting tubes detachably connected to the upper/lower sides of the circulating pipe;
   a cooling water reservoir installed at the inner top end of the main case for storing cooling water;
   a cooling water circulating pump for forcibly circulating the cooling water of the reservoir into the circulating pipe through the entrance/exit-side connecting tubes; and
   heat-proof pins installed at the exit-side connecting tube for cooling heated cooling water which penetrates the exit-side connecting tube.

3. The double boiler as claimed in claim 1, wherein the condensed water collecting means comprises:
   a guiding pipe fixing member coupled to the lower center of the steam condenser and partially protuberant to the exterior of the main case;
   a hollow guiding pipe supporting member screw-coupled to part of the protuberant guiding pipe fixing member and having a hollow downward;
   a steam guiding pipe having steam holes and movably coupled to the hollow of the guiding pipe supporting member;
   a stopper extensively upwardly formed at the inner center of the steam guiding pipe for selectively opening or closing the guiding pipe fixing member along the up and down movement of the steam guiding pipe; and
   a resilient member inserted into the stopper for providing a resilient force to the steam guiding pipe.

4. The double boiler as claimed in claim 1, wherein a guiding piece is spirally formed on the side wall of the steam condenser so that cooling water flows therethrough.

5. The double boiler as claimed in claim 1, wherein a hollow cooling pipe is spirally formed on the outer side wall of the steam condenser so that cooling water flows therethrough.

6. The double boiler as claimed in claim 1, wherein a hollow cooling pipe is spirally formed on the inner side wall of the steam condenser so that cooling water flows therethrough.

7. The double boiler as claimed in claim 2, further comprising a blowing fan installed in the proximity of the heat-proof pins for cooling them by forcibly blowing cool wind toward the pins.

8. The double boiler as claimed in claim 2, further comprising a cooling water residual indicator installed at the outer top end of the main case so that cooling water residual of the cooling water reservoir is confirmed.

* * * * *